United States Patent
Kasuo

(10) Patent No.: US 10,636,371 B2
(45) Date of Patent: Apr. 28, 2020

(54) DRIVING DEVICE, ELECTRONIC TIMEPIECE, DRIVING METHOD, AND STORAGE MEDIUM

(71) Applicant: CASIO COMPUTER CO., LTD., Tokyo (JP)

(72) Inventor: Tomoo Kasuo, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 16/141,038

(22) Filed: Sep. 25, 2018

(65) Prior Publication Data
US 2019/0096342 A1    Mar. 28, 2019

(30) Foreign Application Priority Data
Sep. 27, 2017  (JP) .................................. 2017-186461

(51) Int. Cl.
| G09G 3/36 | (2006.01) |
| G06F 1/16 | (2006.01) |
| G04B 19/00 | (2006.01) |

(52) U.S. Cl.
CPC ........... *G09G 3/3614* (2013.01); *G04B 19/00* (2013.01); *G06F 1/163* (2013.01); *G09G 3/3655* (2013.01); *G09G 2300/0823* (2013.01); *G09G 2300/0857* (2013.01); *G09G 2310/0243* (2013.01); *G09G 2310/08* (2013.01); *G09G 2340/0435* (2013.01)

(58) Field of Classification Search
CPC .... G09G 3/3614; G09G 3/3629; G06F 1/163; G04B 19/00
See application file for complete search history.

(56) References Cited

U.S. PATENT DOCUMENTS

| 2012/0306835 A1 | 12/2012 | Kitagawa et al. |
| 2012/0313924 A1* | 12/2012 | Kitagawa ............... G09G 5/003 345/212 |
| 2014/0340383 A1* | 11/2014 | Gyouten .............. G09G 3/3696 345/212 |

FOREIGN PATENT DOCUMENTS

JP         5450784 B2    3/2014

* cited by examiner

*Primary Examiner* — Sardis F Azongha
(74) *Attorney, Agent, or Firm* — Scully Scott Murphy & Presser

(57) ABSTRACT

An electronic timepiece includes a display, a driver that drives the display, and a CPU that controls the driver. The CPU inverts, in a time less than or equal to a reference inversion time and at an inversion timing of a constant polarity inversion cycle, a polarity of a voltage to be applied to the display. Additionally, the CPU outputs image data to the driver at an image update timing of a cycle that is synchronized with the inversion cycle and that is equivalent to a reference cycle equal to the inversion cycle multiplied by an inverse of an integer. The image update timing is a time when a reference adjustment time elapses after a timing of the reference cycle. The reference adjustment time is less than a time of the reference cycle and greater than or equal to the reference inversion time.

17 Claims, 15 Drawing Sheets

DRIVING DEVICE, ELECTRONIC TIMEPIECE, DRIVING METHOD, AND STORAGE MEDIUM

CROSS-REFERENCE TO RELATED APPLICATION

This application claims the benefit of Japanese Patent Application No. 2017-186461, filed on Sep. 27, 2017, the entire disclosure of which is incorporated by reference herein.

FIELD

This application relates generally to a driving device, an electronic timepiece, a driving method, and a storage medium.

BACKGROUND

The liquid crystal of liquid crystal display devices is driven by alternating current in order to suppress degradation of the liquid crystal. A 50% time ratio (50% duty ratio) is preferable for the period in which the driving voltage is positive and the period in which the driving voltage is negative, respectively. As such, the polarity of the voltage driving the liquid crystal is inverted on a constant cycle. However, inverting the polarity of the driving voltage while the image data to be displayed on the liquid crystal is being updated may result in it being impossible to normally update the image data. To solve this problem, techniques have been developed to ensure that the image data update timing and the driving voltage polarity inversion timing do not temporally overlap. For example, Japanese Patent No. 5450784 describes a liquid crystal display device in which, when there is a possibility that an image data update and a driving voltage polarity inversion will temporally overlap, these operations are prevented from temporally overlapping by performing the image data update after the driving voltage polarity inversion.

With the liquid crystal display device described in Japanese Patent No. 5450784, when there is a possibility that the image data update and the driving voltage polarity inversion will temporally overlap, the start of the image data update is delayed such that the image data update starts after the driving voltage polarity inversion. However, with such a configuration, in cases where an image data update occurs both before and after the timing of the driving voltage polarity inversion, the image data update occurring before the polarity inversion will be shifted to after the polarity inversion. Consequently, the image data update will be continuously performed twice, without interval, after the polarity inversion. Thus, while these two pieces of image data were originally intended to be displayed at a constant time interval, the first image data is displayed only for a moment and then the next image data is displayed, thereby resulting in an unnatural display.

SUMMARY

A driving device, an electronic timepiece, a driving method, and a non-transitory storage medium are disclosed.

A driving device according to a preferred embodiment includes a driver that drives a display, and a processor that controls the driver. The processor inverts, in a time less than or equal to a reference inversion time and at an inversion timing of a constant polarity inversion cycle, a polarity of a voltage to be applied to the display; and outputs image data to the driver at an image update timing of a cycle that is synchronized with the inversion cycle and that is equivalent to a reference cycle equal to the inversion cycle multiplied by an inverse of an integer. The image update timing is a time when a reference adjustment time elapses after a timing of the reference cycle, and the reference adjustment time is less than a time of the reference cycle and greater than or equal to the reference inversion time.

DETAILED DESCRIPTION

Figure 1:
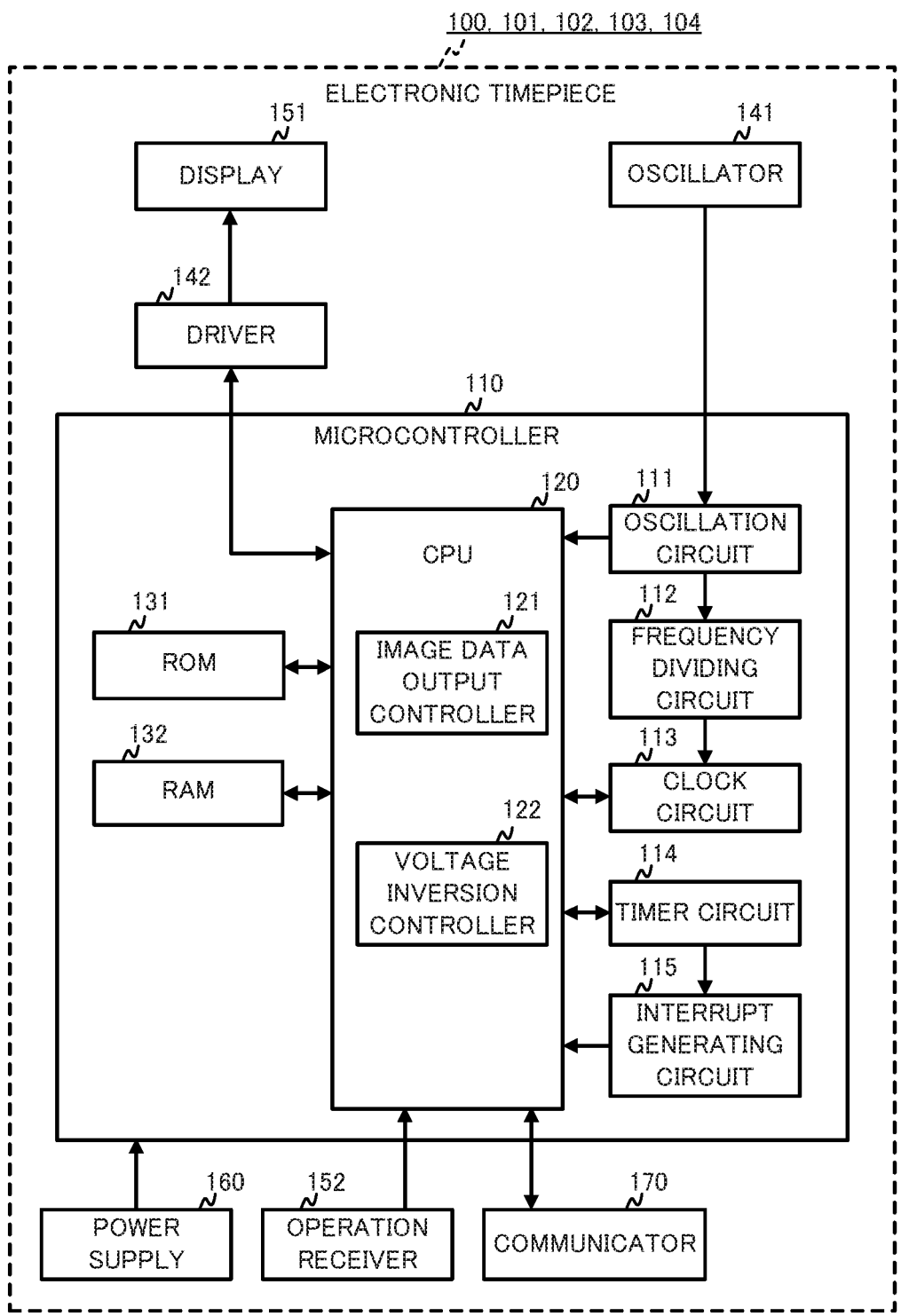
FIG. 1 is a drawing illustrating a configuration example of an electronic timepiece according to Embodiment 1.

Hereinafter, embodiments are described while referencing the drawings. Note that, in the drawings, identical or corresponding components are marked with the same reference numerals.

Embodiment 1

As illustrated in FIG. 1, an electronic timepiece 100 according to Embodiment 1 includes, as hardware components, a microcontroller 110, an oscillator 141, a display 151, an operation receiver 152, a power supply 160, and a communicator 170.

The microcontroller 110 includes an oscillation circuit 111, a frequency dividing circuit 112, a clock circuit 113, a timer circuit 114, an interrupt generating circuit 115, a central processing unit (CPU) 120, read-only memory (ROM) 131, and random-access memory (RAM) 132. Note that the oscillation circuit 111, the frequency dividing circuit 112, the clock circuit 113, the timer circuit 114, the interrupt generating circuit 115, the ROM 131, and the RAM 132 are not limited to being provided in the microcontroller 110 and may be provided outside the microcontroller 110. Additionally, the oscillator 141, the driver 142, the power supply 160, and the communicator 170 are not limited to being provided outside the microcontroller 110 and may be provided in the microcontroller 110.

The oscillation circuit 111 causes the oscillator 141 to oscillate, thereby generating and outputting a predetermined frequency signal (clock signal).

The frequency dividing circuit 112 divides the frequency signal input from the oscillation circuit 111 into signals of frequencies to be used by the clock circuit 113 and the CPU 120, and outputs these signals. The frequencies of the output signals may be changed on the basis of settings set by the CPU 120.

The clock circuit 113 keeps the current time by counting the number of times signals are input from the frequency dividing circuit 112. Note that the clock circuit 113 may be configured from software that changes a value stored in the RAM 132 every predetermined time (for example, every one second), or may be configured from dedicated hardware. The time kept by the clock circuit 113 may be any of cumulative time from a predetermined timing, coordinated universal time (UTC), standard time of a region or country such as Japan Standard Time (JST), the time of a preset city (local time), or the like. Additionally, the time kept by the clock circuit 113 need not be in a year-month-day-hour-minute-second format.

The timer circuit 114 counts interrupt cycles and notifies the interrupt generating circuit 115 that an interrupt cycle has passed each time an interrupt cycle passes. A plurality of interrupt cycles (for example, a ⅛ second interrupt cycle and a 1 second interrupt cycle) can be set in the timer circuit 114. The timer circuit 114 notifies the interrupt generating circuit 115 of which interrupt cycle has passed. The following two interrupt cycles are set as interrupt cycles in the present embodiment. First, a cycle for changing the polarity of the voltage to be applied to the display 151 (polarity inversion cycle) is set as a 1 second interrupt cycle. Second, a cycle for updating image data to be displayed on the display 151 (reference cycle) is set as a ⅛ second interrupt cycle. A frequency of the polarity inversion cycle is obtained by dividing a frequency of the reference cycle by eight.

When the interrupt generating circuit 115 receives a notification from the timer circuit 114, the interrupt generating circuit 115 outputs an interrupt request signal to the CPU 120. As described above, a plurality of interrupt cycles (for example, a ⅛ second interrupt cycle and a 1 second interrupt cycle) can be set in the timer circuit 114, and the interrupt generating circuit 115 outputs an interrupt request signal to the CPU 120 on the basis of the notification from the timer circuit 114. It is possible to distinguish which interrupt cycle the interrupt is based on from the interrupt request signal. The CPU 120 can acquire each of the ⅛ second reference cycle and the 1 second polarity inversion cycle from these two interrupt cycles. In this case, the reference frequency is 8 Hz, which is the reciprocal of the reference cycle, and the polarity inversion frequency is 1 Hz, which is the reciprocal of the polarity inversion cycle. Since the polarity inversion frequency is obtained by dividing the reference frequency by 8, the reference frequency is 8-times the polarity inversion frequency. However, the relationship between the reference cycle (the reference frequency) and the polarity inversion cycle (the polarity inversion frequency) is not limited thereto. Any reference cycle may be used, provided that the reference cycle is equal to the polarity inversion cycle multiplied by an inverse of an integer.

The CPU 120 is a processor that carries out various types of arithmetic processing and overall control of all operations of the electronic timepiece 100. While using the RAM 132 as working memory, the CPU 120 reads control programs from the ROM 131 and carries out arithmetic control, display control, and the like related to the various functions of the electronic timepiece 100. The CPU 120 may be compatible with multithreading functionality. When the CPU 120 is compatible with multithreading functionality, a plurality of threads (different processing flows) can be executed in parallel. Note that, in the present embodiment, the example of the driving device according to the present disclosure includes the CPU 120 and the driver 142.

The ROM 131 is nonvolatile memory such as mask ROM or flash memory. Control programs, initial setting data, and the like are stored in the ROM 131. The control programs stored in the ROM 131 include a program related to the control of voltage inversion and image data output (described later) implemented to drive the display 151.

The RAM 132 is volatile memory such as static random access memory (SRAM) or dynamic random access memory (DRAM). The RAM 132 is working memory. Temporary data, various types of setting data, image data to be displayed on the display 151, and the like are stored in the RAM 132. In the present embodiment, the image data represents, for example, the current time, the date, the day of the week, the battery level, and the like.

In one example, the oscillator 141 is a crystal oscillator and generates a unique frequency signal in combination with the oscillation circuit 111.

Figure 2:
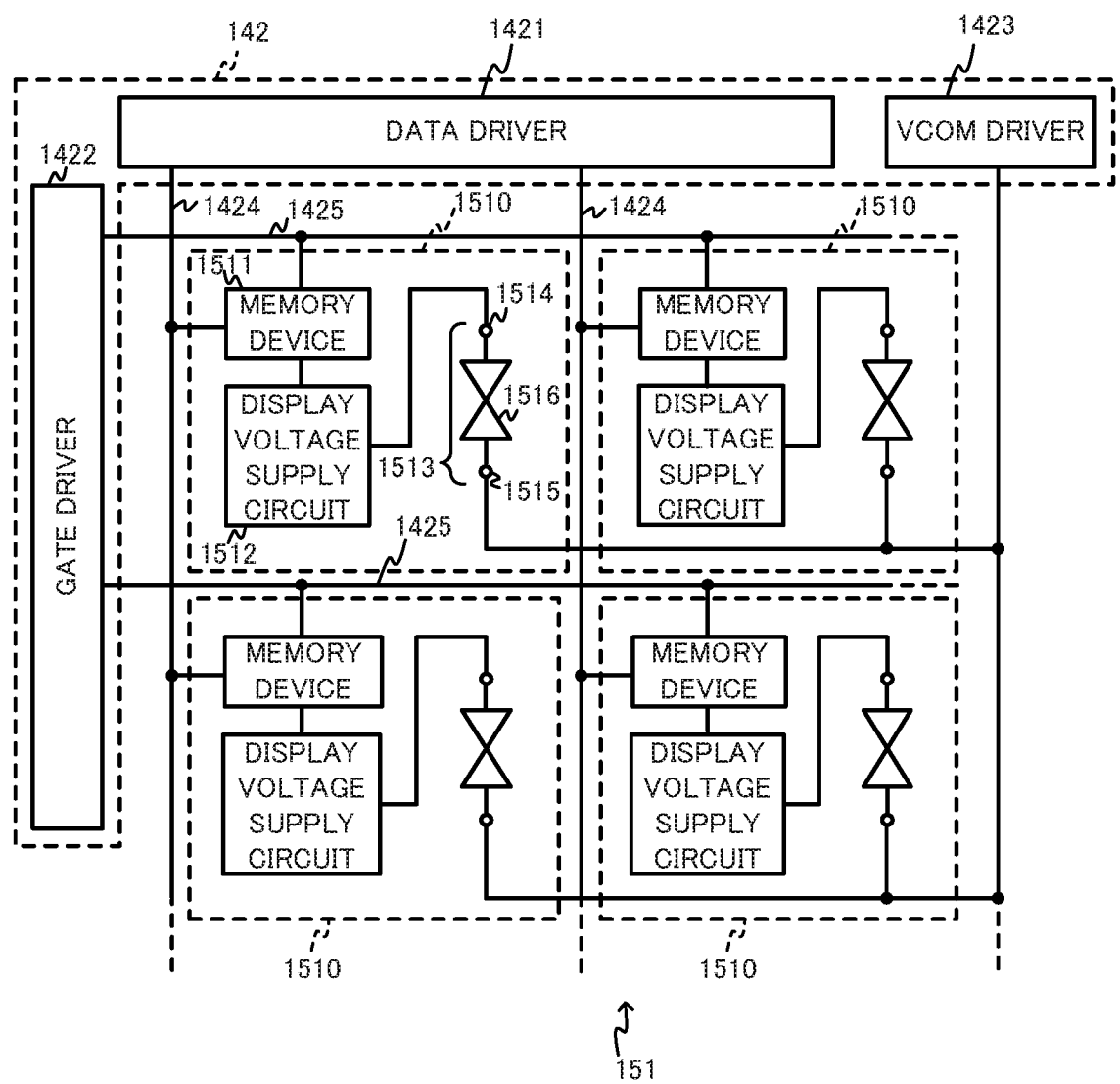
FIG. 2 is a drawing explaining the configurations of a driver and a display according to Embodiment 1.

The driver 142 outputs, on the basis of a control signal from the CPU 120, a driving signal for driving the display 151 to the display 151, thereby causing the time and various functions to be displayed on the display 151. Specifically, as illustrated in FIG. 2, the driver 142 includes a data driver 1421, a gate driver 1422, and a VCOM (common electrode voltage) driver 1423. The data driver 1421 outputs data signals to data bus lines 1424 on the basis of control signals and clock signals from the CPU 120. The gate driver 1422 outputs scan signals to gate bus lines 1425 on the basis of control signals and clock signals from the CPU 120. The VCOM driver 1423 outputs, on the basis of control signals from the CPU 120, voltage (common electrode voltage: VCOM) to be applied to common electrodes 1515 of display devices 1513 (described later). In the present embodiment, the polarity of the common electrode voltage is inverted at a timing determined by the CPU 120.

The display 151 displays data related to the time, the various functions, and the like. In the present embodiment, the display 151 includes a plurality of pixels arranged in a grid. Each of these pixels is a memory in pixel (MIP) liquid crystal display that includes a memory device in which the display data of that pixel is stored. When displaying an image on the display 151, the driver 142 outputs data signals to pixels that are to display. These data signals are stored in the memory devices of the pixels that are to display. Then, the image is displayed by applying voltage corresponding to the data stored in the each memory device between a pixel electrode and a common electrode.

Specifically, as illustrated in FIG. 2, the plurality of pixels 1510 of the display 151 each include a memory device 1511, a display voltage supply circuit 1512, and a display device 1513. The display device 1513 includes a pixel electrode 1514, a common electrode 1515, and a liquid crystal 1516.

When, in order to display the image data on a pixel 1510, the gate driver 1422 outputs a scan signal to the gate bus line 1425 that includes the pixel 1510 that is to display and the data driver 1421 outputs a data signal, the data signal is recorded in the memory device 1511 of the pixel 1510. Then, voltage corresponding to the data recorded in the memory device 1511 is supplied to the pixel electrode 1514 by the display voltage supply circuit 1512. The image is displayed due to the voltage supplied by the VCOM driver 1423 between the common electrode 1515 and the pixel electrode 1514.

When it is necessary to rewrite the image being displayed, the data driver 1421 and the gate driver 1422 become active and update the data recorded in the memory device 1511. As a result, the display content is rewritten. However, when it is not necessary to rewrite the image being displayed (when maintaining the current display content), the potential of the pixel electrode 1514 is maintained by the display voltage supply circuit 1512, thereby enabling the display 151 to maintain, as-is, the display of the data recorded in the memory device 1511. Accordingly, the data driver 1421 and the gate driver 1422 are stopped. As a result of these operations, the memory in pixel liquid crystal display can achieve lower power consumption compared to a general thin film transistor (TFT) liquid crystal display.

The operation receiver 152 receives input operations from the user and outputs, to the CPU 120, electronic signals corresponding to the input operations as input signals. In one example, the operation receiver 152 includes push button switches and a crown and stem. Alternatively, a configuration is possible in which the operation receiver 152 is provided by laminating a touch sensor on a display screen of the display 151, thereby providing both a display screen and a touch panel. In this case, the touch sensor detects a contact position and/or a contact mode related to a contact operation on the touch sensor by the user, and outputs, to the CPU 120, an operation signal corresponding to the detected contact position and/or contact mode.

In one example, the power supply 160 includes a battery and a voltage conversion circuit. The power supply 160 supplies power at the operating voltages of the various components in the electronic timepiece 100. In the present embodiment, examples of the battery of the power supply 160 include primary batteries such as button type dry batteries. Alternatively, a solar panel and a secondary battery may be used as the battery of the power supply 160.

The communicator 170 includes a radio frequency (RF) circuit, a baseband (BB) circuit, and the like. In one example, the communicator 170 sends and receives radio signals based on Bluetooth (registered trademark) Low Energy (hereinafter referred to as "BLE"). The communicator 170 demodulates and/or decrypts the received radio signals, and sends these radio signals to the CPU 120. Moreover, the communicator 170 encrypts and/or modulates signals sent from the CPU 120, and sends these signals out.

Next, the functional configuration of the CPU 120 of the electronic timepiece 100 according to Embodiment 1 will be described. As illustrated in FIG. 1, the CPU 120 functions as an image data output processor 121 and as a voltage inversion processor 122. The functions of the image data output processor 121 and the voltage inversion processor 122 may be realized by the CPU 120 alone or may be respectively realized by independent CPUs. Moreover, these functions may be realized by a processor other than the CPU 120. For example, these functions may be realized by a CPU of a component other than the microcontroller 110.

The CPU 120 as the image data output processor 121 instructs the driver 142 to output the image data to the display 151. For example, when it is necessary to update an image being displayed on the display 151 due to the detection of a user operation via the operation receiver 152, an update of the time display, or the like, the CPU 120 generates image data to be output and records this image data in the RAM 132. Then, at an image update timing (described later), the CPU 120 outputs, to the driver 142, a vertical address (GS: gate select) and a horizontal address (SS: source select) to designate a display position (output address of the display 151) and, thereafter, the CPU 120 outputs the image data (DATA 1 to DATA n) recorded in the RAM 132. Then, the driver 142 writes the image data to the various pixels 1510 of the display 151, and the image is displayed.

The CPU 120 as the voltage inversion processor 122 instructs the driver 142 to invert, every interrupt cycle (for example, the 1 second polarity inversion cycle described above), the polarity of the voltage (VCOM: common electrode voltage) to be applied to the common electrode 1515 of the display 151, and output this voltage. The driver 142, which has been instructed to invert the polarity of the common electrode voltage, causes the VCOM driver 1423 to invert the polarity of the common electrode voltage.

Figure 3:
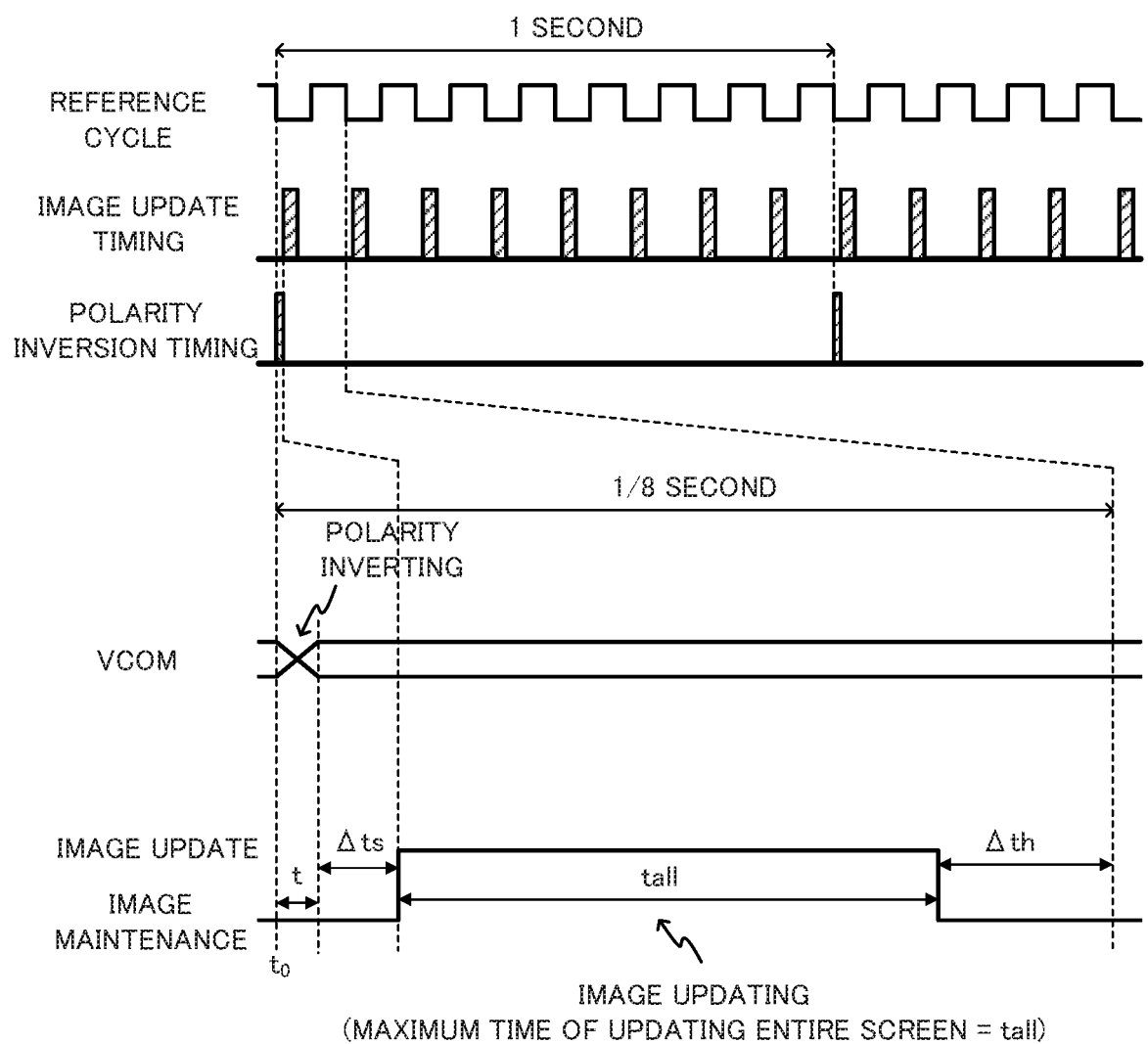
FIG. 3 is a drawing explaining the relationship between image update timing and polarity inversion timing in Embodiment 1.

Next, the relationship between the image update timing and the polarity inversion timing in the present embodiment will be explained while referencing FIG. 3. Here, the image update timing is a timing at which the CPU 120 outputs the image data to the driver 142. The top row in FIG. 3 depicts the reference cycle (for example, the ⅛ second reference cycle described above) on which the image update timing is generated. The second row represents the image update timing, and the third row represents the inversion timing of the common electrode voltage (the polarity inversion timing). The fourth and fifth rows of FIG. 3 are 8-fold magnifications of the horizontal (time) direction scale. The fourth row depicts the inversion of the common electrode voltage (VCOM), and the fifth row depicts the image updating.

FIG. 3 illustrates that an interrupt request signal (the aforementioned interrupt request signal every 1 second polarity inversion cycle) of the polarity inversion timing is generated at time t0. The CPU 120 (voltage inversion processor 122) inverts the common electrode voltage on the basis of this interrupt request signal. The fifth row of FIG. 3 illustrates that the time of a reference inversion time t is required for the inversion of the common electrode voltage to complete. Likewise, the fifth row of FIG. 3 illustrates that the image update timing occurs t+$\Delta$ts after the time t0, and that the CPU 120 starts the image updating at this image update timing. The image update timing is a time when t+$\Delta$ts elapses after the generation of the interrupt request signal of every ⅛ second reference cycle. Accordingly, the CPU 120 starts the image update after waiting t+$\Delta$ts after the reception of the interrupt request signal of every reference cycle. Herein, t+$\Delta$ts is called "reference adjustment time." Moreover, the fifth row of FIG. 3 illustrates that a time tall is required for the image update, and that there is a time margin of $\Delta$th from the completion of the image update to the subsequent image update timing. Due to the specifications of the display 151, image updating is prohibited from the completion of the polarity inversion of the common electrode voltage until the passage of the time of Δts. Moreover, polarity inverting of the common electrode voltage is prohibited from the completion of the image update until the passage of the time of Δth. As such, the fifth row of FIG. 3 illustrates timings that take Δts and Δth into consideration. Herein, Δts is called "display update prohibited time" and Δth is called "inversion prohibited time."

While the time tall of the image update varies depending on the size of the image data, herein, the time when updating the entire screen of the display 151 (maximum display update time) is expressed as "tall." As such, in order to satisfy the temporal relationships depicted on the bottom row of FIG. 3 and perform the image update, Equation (1) below must be satisfied:

$$t+\Delta ts+\text{tall}+\Delta th<\tfrac{1}{8}\,s \tag{1}$$

In one example, if t=0.2 ms, Δts=4 ms, tall=119 ms, and Δth=1 ms, t+Δts+tall+Δth=124.2 ms. Since ⅛s=125 ms, it is clear that Equation (1) will be satisfied if tall <119 ms. In the electronic timepiece 100 of the present embodiment, the time required to perform the image update of the entire screen of the display 151 is, at longest, 100 ms. As such, it is clear that Equation (1) is satisfied. Note that, when the time (tall) required for the image update of the entire screen is 120 ms or greater, the reference cycle for generating the image update timing must be changed to tall or greater (a cycle equal to the polarity inversion cycle multiplied by an inverse of an integer). For example, the reference cycle may be changed to ⅐, ⅙, ¼, or the like of the polarity inversion cycle (the polarity inversion cycle multiplied by the inverse of the integer).

It is clear that, when the aforementioned Equation (1) is satisfied, time margins greater than or equal to Δts and Δth are provided and, as such, as illustrated in the bottom row of FIG. 3, the polarity inversion of the common electrode voltage and the image update are guaranteed not to temporally overlap.

Thus, when an interrupt request signal corresponding to the timing for inverting the polarity of the common electrode voltage is received, the CPU 120 inverts the polarity of the common electrode voltage via the driver 142. Moreover, when an interrupt request signal corresponding to the timing of the image update is received, the CPU 120 waits t+Δts and then updates, via the driver 142, the image being displayed on the display 151. These two interrupt signals are synchronized and the timing of the polarity inversion and the timing of the image update are offset at least t+Δts from each other. As a result, these two timings are guaranteed never to overlap.

Figure 4:
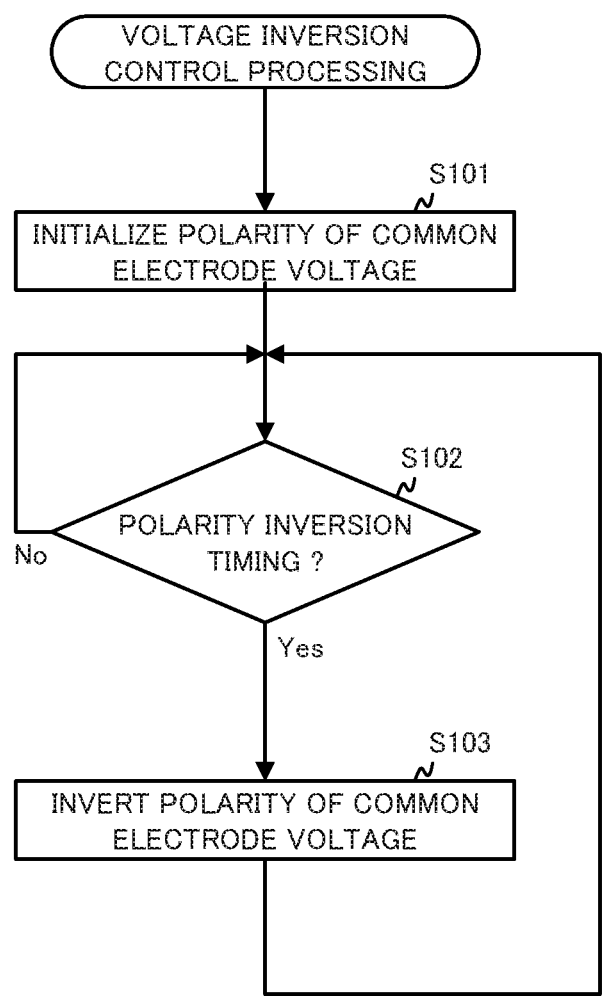
FIG. 4 is a flowchart illustrating the control procedures of voltage inversion control processing, executed by a CPU of the electronic timepiece, according to Embodiment 1.

Next, the control procedures of the voltage inversion control processing executed by the CPU 120 of the electronic timepiece 100 will be described while referencing FIG. 4. The voltage inversion control processing is processing for inverting the common electrode voltage. After the electronic timepiece 100 is started up and the interrupt setting of the polarity inversion cycle (for example, every 1 second) is performed, the voltage inversion control processing is started up as one thread. The voltage inversion control processing is started in parallel with the other threads.

When the voltage inversion control processing starts, the CPU 120 instructs the driver 142 to initialize the polarity of the common electrode voltage (step S101). In one example, the CPU 120 instructs the driver 142 to set the common electrode voltage to 0V as the initial value of the polarity of the common electrode voltage.

Next, the CPU 120 determines whether it is the polarity inversion timing (step S102). Whether it is the polarity inversion timing can be determined by whether the interrupt request signal of the polarity inversion cycle has been received. If the interrupt request signal of the polarity inversion cycle has been received, it is the polarity inversion timing, and if the interrupt request signal of the polarity inversion cycle has not been received, it is not the polarity inversion timing. The interrupt request signal of the polarity inversion cycle is output from the interrupt generating circuit 115 every polarity inversion cycle (for example, every 1 second).

If it is not the polarity inversion timing (step S102; No), the CPU 120 waits until the polarity inversion timing. If it is the polarity inversion timing (step S102; Yes), the CPU 120 instructs the driver 142 to invert the polarity of the common electrode voltage (step S103). Thereafter, the CPU 120 returns to the processing of step S102. Step S103 is also called a "voltage inversion control step."

The polarity of the common electrode voltage is inverted in the polarity inversion cycle as a result of the voltage inversion control processing described above. Since the duty ratio of the polarity inversion cycle is 50%, degradation of the liquid crystal of the display 151 can be suppressed to the greatest degree possible.

Figure 5:
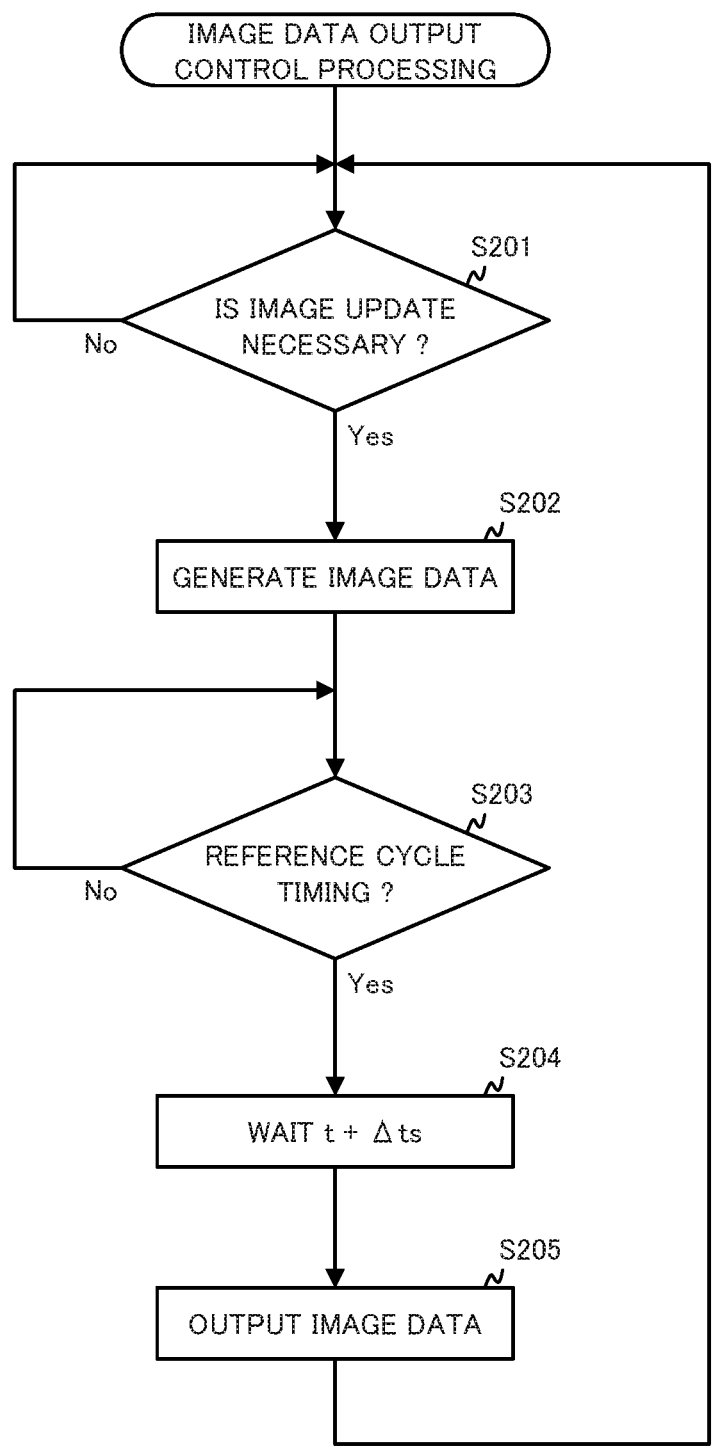
FIG. 5 is a flowchart illustrating the control procedures of image data output control processing, executed by the CPU of the electronic timepiece, according to Embodiment 1.

Next, the control procedures of the image data output control processing executed by the CPU 120 of the electronic timepiece 100 will be described while referencing FIG. 5. The image data output control processing is processing whereby the CPU 120 displays image data on the display 151. After the electronic timepiece 100 is started up and the interrupt setting of the reference cycle (for example, every ⅛ second) is performed, the CPU 120 starts up the image data output control processing as one thread. The image data output control processing is started in parallel with the other threads.

When the image data output control processing starts, the CPU 120 determines whether it is necessary to update the image data being displayed on the display 151 (step S201). It is necessary to update the image data in situations such as when, for example, there is nothing displayed on the display 151 immediately after startup of the electronic timepiece 100, when it is necessary to update the time display due to the passage of time (for example, every 1 second, every 1 minute, or the like), and when a user operation is detected by the operation receiver 152.

If it is not necessary to update the image data (step S201; No), the CPU 120 waits until it is necessary to update the image data. If it is necessary to update the image data (step S201; Yes), the CPU 120 generates image data to be output to the display 151 (step S202). Moreover, the CPU 120 records the generated image data in the RAM 132.

Next, the CPU 120 determines whether it is a reference cycle timing (step S203). The reference cycle timing is the interrupt timing of each reference cycle, and can be determined by whether an interrupt request signal of the reference cycle has been received. If the interrupt request signal of the reference cycle has been received, it is the reference cycle timing, and if the interrupt request signal of the reference cycle has not been received, it is not the reference cycle timing. The interrupt request signal of the reference cycle is output from the interrupt generating circuit 115 every reference cycle (for example, every ⅛ second).

If it is not the reference cycle timing (step S203; No), the CPU 120 waits until the reference cycle timing. If it is the reference cycle timing (step S203; Yes), the CPU 120 waits the time of t+Δts (step S204). Then, the CPU 120 outputs the image data generated in step S202 to the driver 142 (step S205). Thereafter, the CPU 120 returns to the processing of step S201. Step S205 is also called an "image data output control step."

By performing the image data output control processing described above, the CPU 120 can output the image data to the driver 142 at a timing that is different from the timing of the polarity inversion of the common electrode voltage.

Thus, the CPU 120 of the electronic timepiece 100 according to Embodiment 1 carries out control so that the timing at which the polarity of the common electrode voltage is inverted and the timing at which the image data is output do not overlap. Accordingly, for example, situations can be prevented in which, due to the polarity of the common electrode voltage being inverted while outputting the image data, the image data is not normally recorded in the memory device 1511 of the pixel 1510 and a rewrite error occurs. As a result, declines in the reliability of the display 151 can be prevented. Moreover, since the timing at which the CPU 120 updates the image data is constantly maintained by the reference cycle, the image data to be displayed can be smoothly updated.

Embodiment 2

Figure 6:
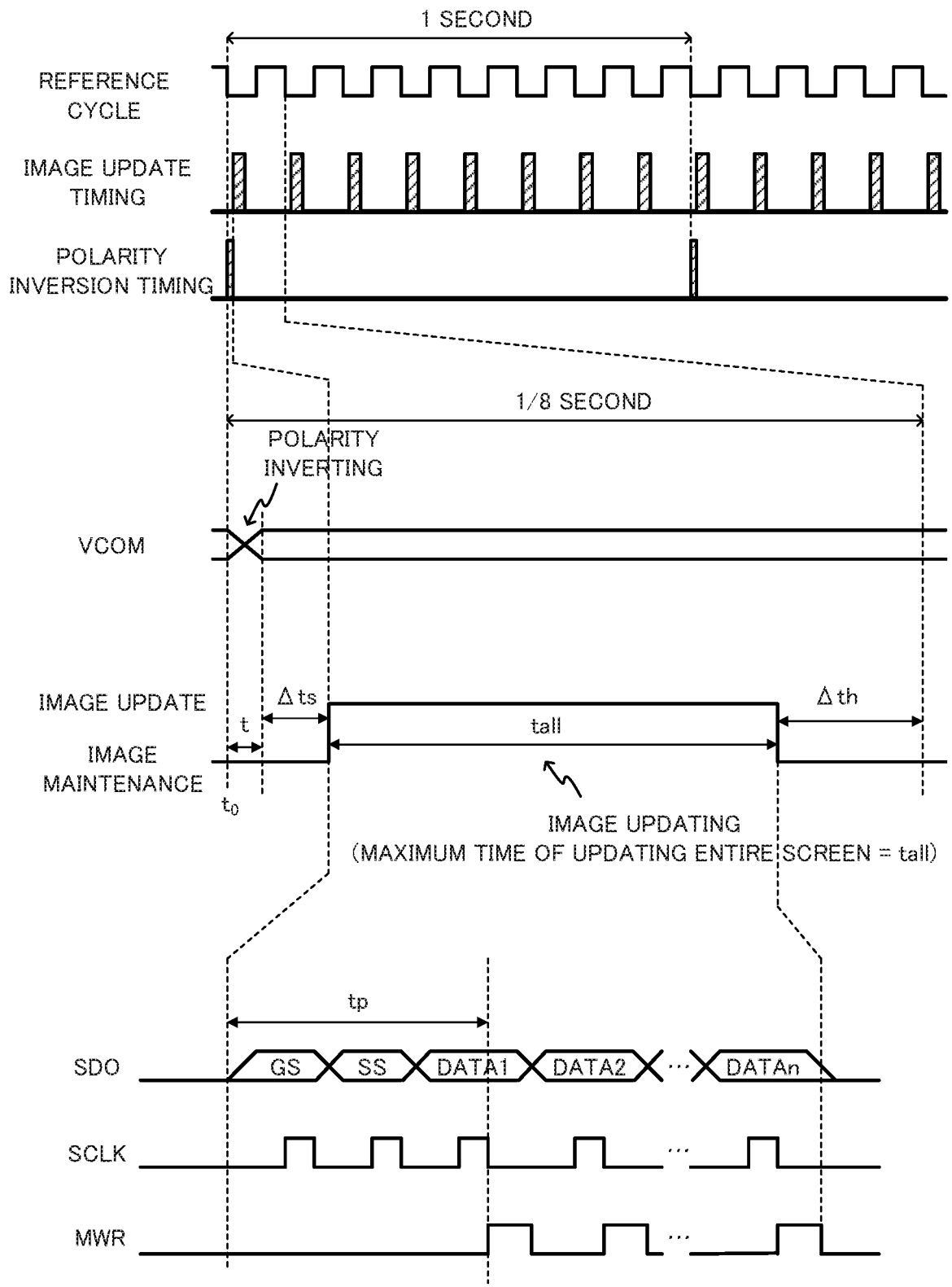
FIG. 6 is a drawing explaining the details of the timing of data output during an image update in Embodiment 1.

With the electronic timepiece 100 according to Embodiment 1, the CPU 120 outputs the image data to the driver 142 after it becomes the image update timing. For the CPU 120 to output the image data to the driver 142, the data must be output after the vertical address (GS) and the horizontal address (SS) are set. Specifically, as illustrated in FIG. 6, first, the vertical address (GS) is output to the serial data output (SDO) of the driver 142 and the serial clock (SCLK) of the driver 142 is launched. Thus, the vertical address is set in the driver 142. Next, the horizontal address (SS) is output to the SDO and the SCLK is launched. Thus the horizontal address is set in the driver 142. Thus, both the vertical address and the horizontal address are set, thereby completing preparations for outputting the data.

Then, the image data (DATA) is set in the driver 142 by outputting one piece of image data to the SDO and launching the SCLK. Thereafter, the one piece of image data is written to the display 151 by setting a write activation signal (MWR: memory write) to "H" (High level). Thereafter, it is possible to consecutively write data without setting the vertical address and the horizontal address. That is, there is a time lag (tp) resulting from the time required to set the vertical address, the horizontal address, and the like. This time lag tp is from when the CPU 120 attempts to output the image data to when the image data is actually written to the display 151. Accordingly, even if the CPU 120 starts the image data output control processing earlier by the time lag, a time interval of t+Δts can be secured for completion of the polarity inversion of the common electrode voltage and a time period between the completion and the start of the image update. Next, Embodiment 2 will be described. In Embodiment 2, the processing of the CPU 120 is started earlier.

Figure 7:
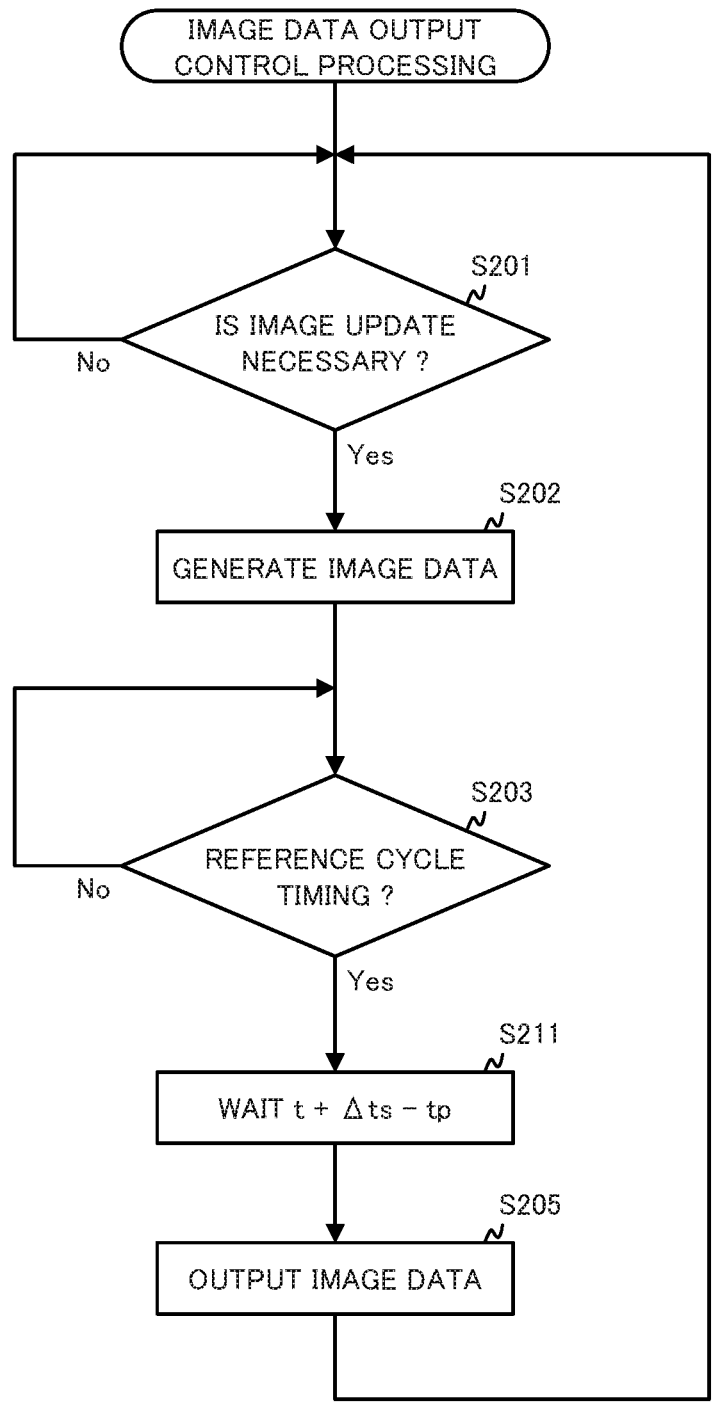
FIG. 7 is a flowchart illustrating the control procedures of image data output control processing, executed by a CPU of the electronic timepiece, according to Embodiment 2.

The only difference between the electronic timepiece 100 according to Embodiment 1 and an electronic timepiece 101 according to Embodiment 2 is the wait time after the reference cycle timing of the image data output control processing. Accordingly, in the following, the image data output control processing of the electronic timepiece 101 is described while referencing FIG. 7. The other configurations and the voltage inversion control processing of the electronic timepiece 101 are the same as those of the electronic timepiece 100. Additionally, FIG. 7 is the same as FIG. 5, with the exception that step S204 of FIG. 5 is replaced by step S211. As such, only step S211 will be described.

Figure 8:
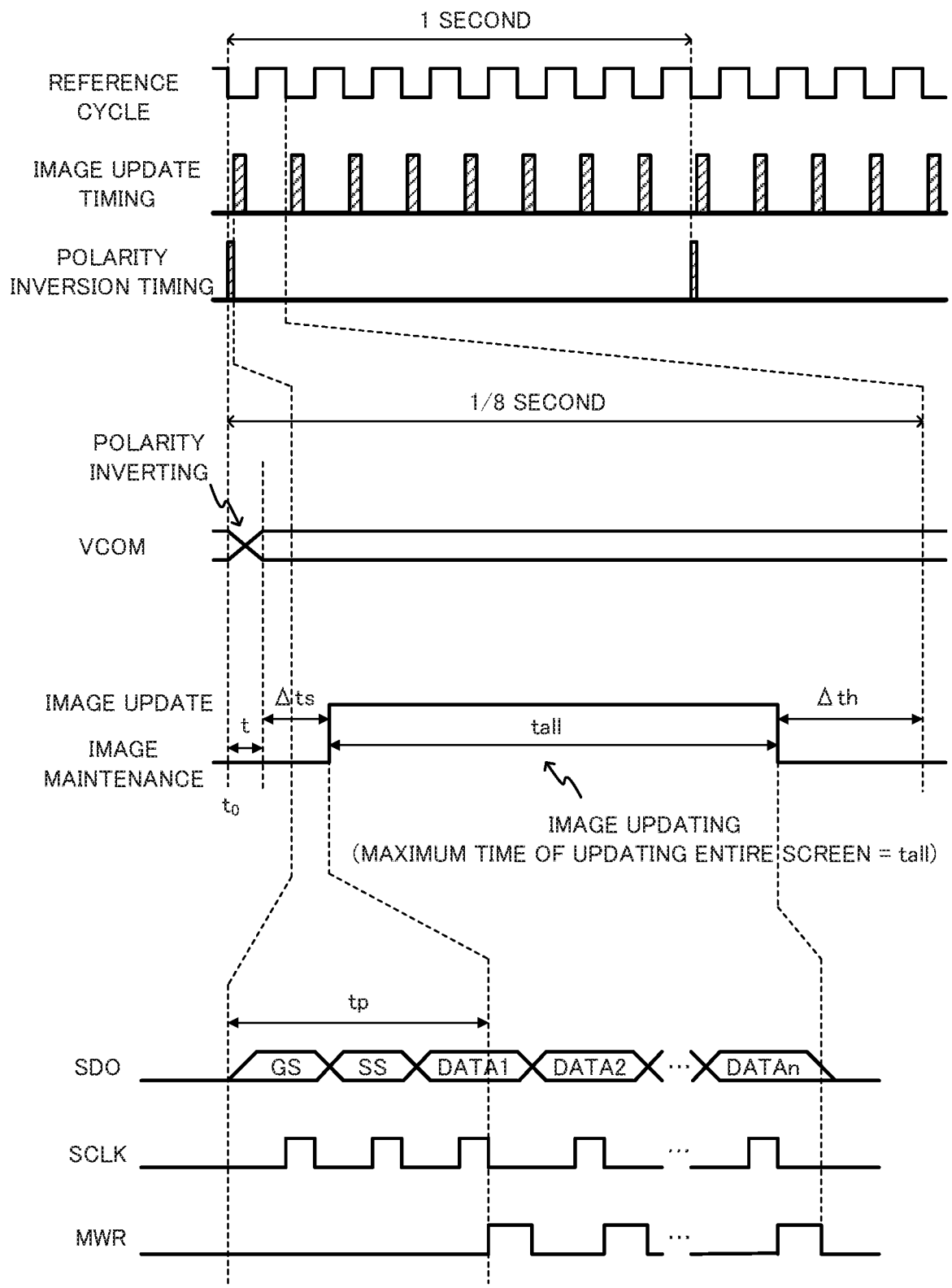
FIG. 8 is a drawing explaining the details of the timing of data output during an image update in Embodiment 2.

In step S211, the CPU 120 waits the time of t+Δts−tp. As illustrated in FIG. 8, tp is the time until the CPU 120 launches the SCLK and launches the write activation signal. Note that the launching of the SCLK results in the setting of the vertical address (GS), the horizontal address (SS), and the data (DATA1) in the driver 142. The value of tp is determined on the basis of the specifications of the driver 142 and the display 151. When there is a possibility that the value of tp may vary within a certain range and cannot be determined as a single value, the minimum value within that range is set as the value of tp. Here, tp is called an "addressing time." In the present embodiment, t+Δts−tp is the reference adjustment time. That is, the reference adjustment time in the present embodiment is obtained by subtracting the addressing time tp from the reference adjustment time (t+Δts) of Embodiment 1.

As a result of the electronic timepiece 101 performing this processing, the time lag of the display can be reduced an amount corresponding to tp, and the image data to be displayed can be updated smoothly and with less delay. These effects can also be confirmed from the fact that, compared to FIG. 6 the image update timing is earlier an amount corresponding to tp in FIG. 8.

Embodiment 3

In the embodiments described above, the maximum time needed to update the entire screen of the display 151 is assumed to be 100 ms. Additionally, a time greater than 100 ms plus t+Δts+Δth is required for the reference cycle. As such, the reference cycle is set to ⅛ second (125 ms). However, for example, in a case in which the maximum time needed to update the entire screen of the display 151 is 50 ms, and 50 ms plus t+Δts+Δth results in a value that is less than 62.5 ms, the reference cycle can be set to 1/16 second (62.5 ms). Next, Embodiment 3, which is an example of such a case, will be described.

The only differences between the electronic timepiece 100 according to Embodiment 1 and an electronic timepiece 102 according to Embodiment 3 are the time required to update the entire screen of the display 151 and the reference cycle. The other configurations, the voltage inversion control processing, and the image data output control processing of the electronic timepiece 102 are the same as those of the electronic timepiece 100.

The time tall required to update the entire screen of the display 151 of the electronic timepiece 102 is 50 ms. The time t required for the inversion of the common electrode voltage to complete, the time Δts, in which image updating is prohibited, from the completion of the polarity inversion of the common electrode voltage, and the time Δth, in which polarity inverting of the common electrode voltage is prohibited, from the completion of the image update are the same as for the electronic timepiece 100. For example, t=0.2 ms, Δts=4 ms, and Δth=1 ms. As such, the value obtained from Equation (1) is 55.2 ms.

Figure 9:
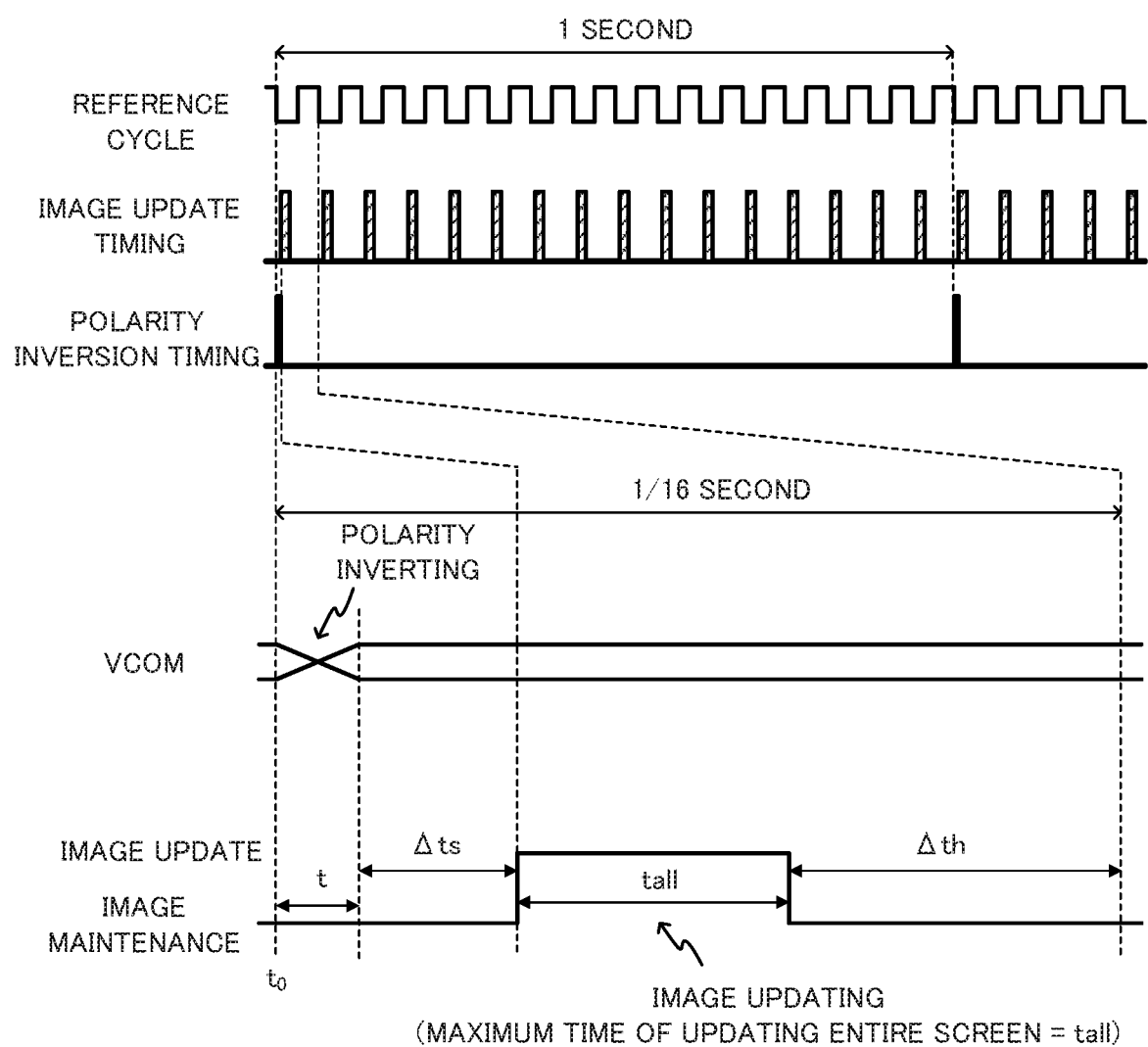
FIG. 9 is a drawing explaining the relationship between image update timing and polarity inversion timing in Embodiment 3.

When the electronic timepiece 100 according to Embodiment 1 is started up, the thread of the image data output control processing is started up after the interrupt setting of the reference cycle (⅛ second) is performed. However, when the electronic timepiece 102 according to Embodiment 3 is started up, the thread of the image data output control processing is started up after the interrupt setting of the reference cycle (1/16 second) is performed. Since 1/16 second=62.5 ms and this value is greater than the value of Equation (1), namely 55.2 ms, the value of t+Δts+tall+Δth is within one cycle of the reference cycle, as illustrated in FIG. 9. Therefore, the period of time during the polarity inversion of the common electrode voltage and the period of time during the image update have the margins of Δts and Δth and, as such, do not temporally overlap with each other.

With the electronic timepiece 102, there are twice as many timings at which the screen can be updated compared to the electronic timepiece 100 and, as such, the screen of the electronic timepiece 102 can be updated a corresponding amount faster and more frequently.

Embodiment 4

Figure 10:
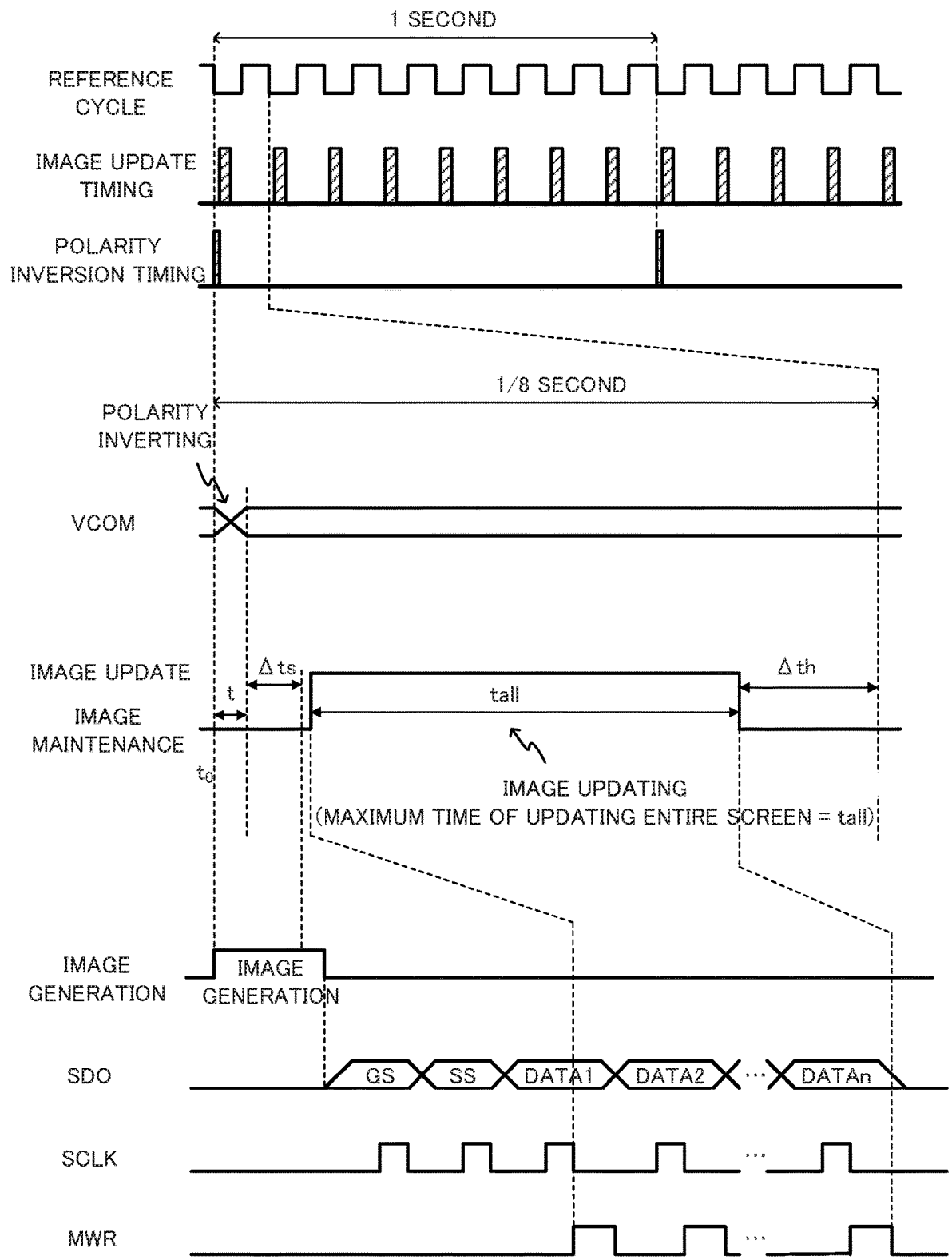
FIG. 10 is a drawing explaining the details of the timing of data output during an image update in Embodiment 4.

In the image data output control processing of Embodiment 1, the CPU 120 generates the image data, then determines whether it is the reference cycle timing and, thereafter waits the time of t+Δts. However, for updates of a second display, the second screen is consistently updated every second, and the time required to generate the image data for updating the second display can be estimated in advance. As such, in the description of Embodiment 4, the efficiency of the image data output control processing is improved for a case in which it is determined that the time required to generate the image data for updating the second display is consistently longer than t+Δts, as illustrated in FIG. 10.

Figure 11:
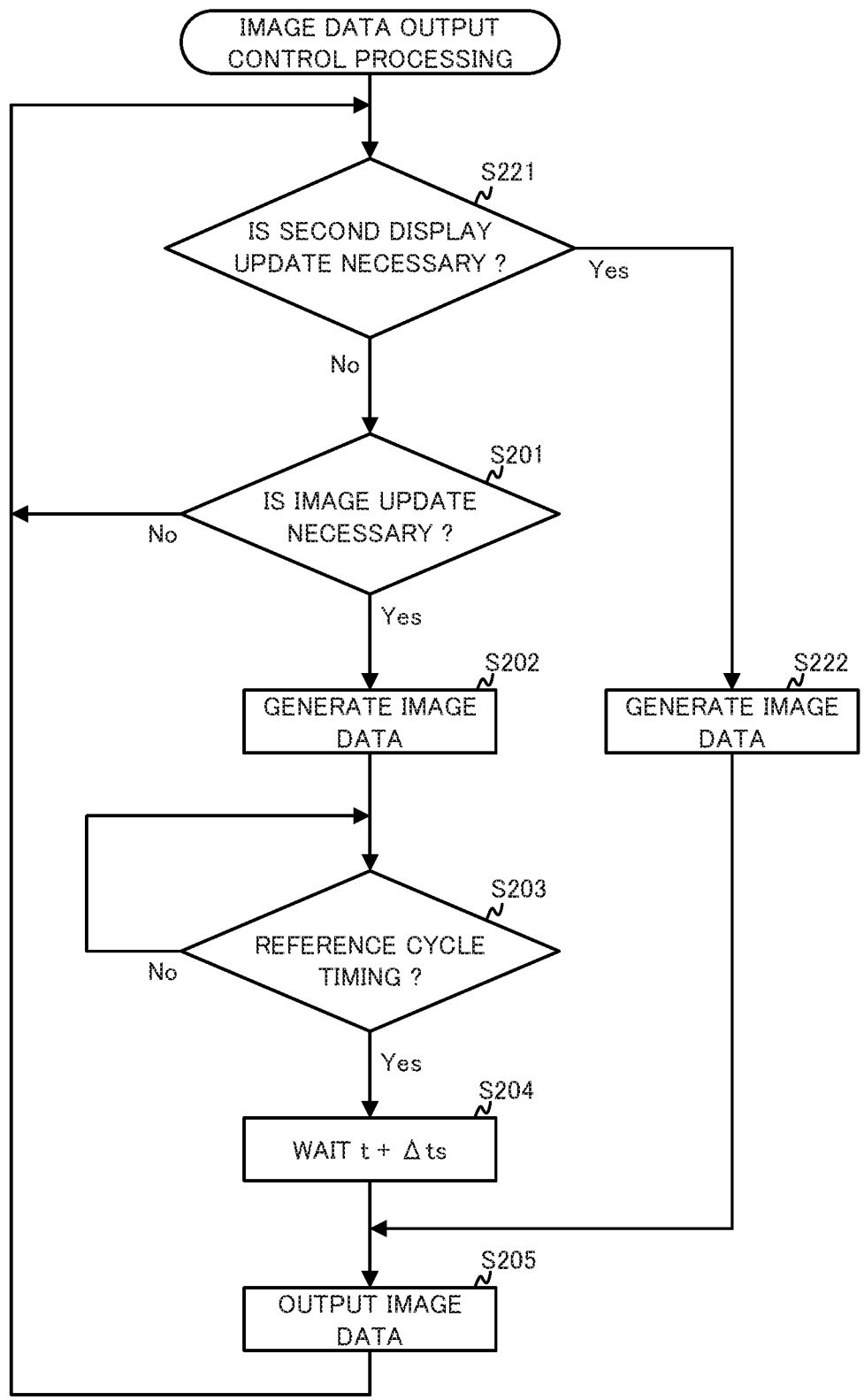
FIG. 11 is a flowchart illustrating the control procedures of image data output control processing, executed by a CPU of the electronic timepiece, according to Embodiment 4.

The only difference between the electronic timepiece 100 according to Embodiment 1 and the electronic timepiece 103 according to Embodiment 4 is the image data output control processing. As such, in the following, the image data output control processing of the electronic timepiece 103 is described while referencing FIG. 11. The other configurations and the voltage inversion control processing of the electronic timepiece 103 are the same as those of the electronic timepiece 100. Note that, in the present embodiment, the polarity inversion cycle of the electronic timepiece 103 is synchronized with the update cycle of the seconds. That is, the polarity inversion of the common electrode voltage and the updating of the second display are carried out at a timing of exactly every second. Additionally, FIG. 11 is the same as FIG. 5, with the exception that step S221 and step S222 are added in FIG. 11. Therefore, steps S221 and step S222 of FIG. 11 will be described.

In step S221, the CPU 120 determines whether it is necessary to update the second display. If it is not necessary to update the second display (step S221; No), step S201 is executed. If it is necessary to update the second display (step S221; Yes), the CPU 120 generates image data for a second display update (step S222). Then, step S205 is executed.

It is clear that the reference cycle timing is also at the timing at which the update of the second display is necessary, and the time of t+Δts or greater is required to generate the image data. As such, in the image data output control processing of Embodiment 4, step S203 and step S204 can be skipped when it is determined that the second display needs to be updated. Accordingly, the load of the image data output control processing can be reduced a corresponding amount and the second display can be updated faster.

Embodiment 5

Figure 12:
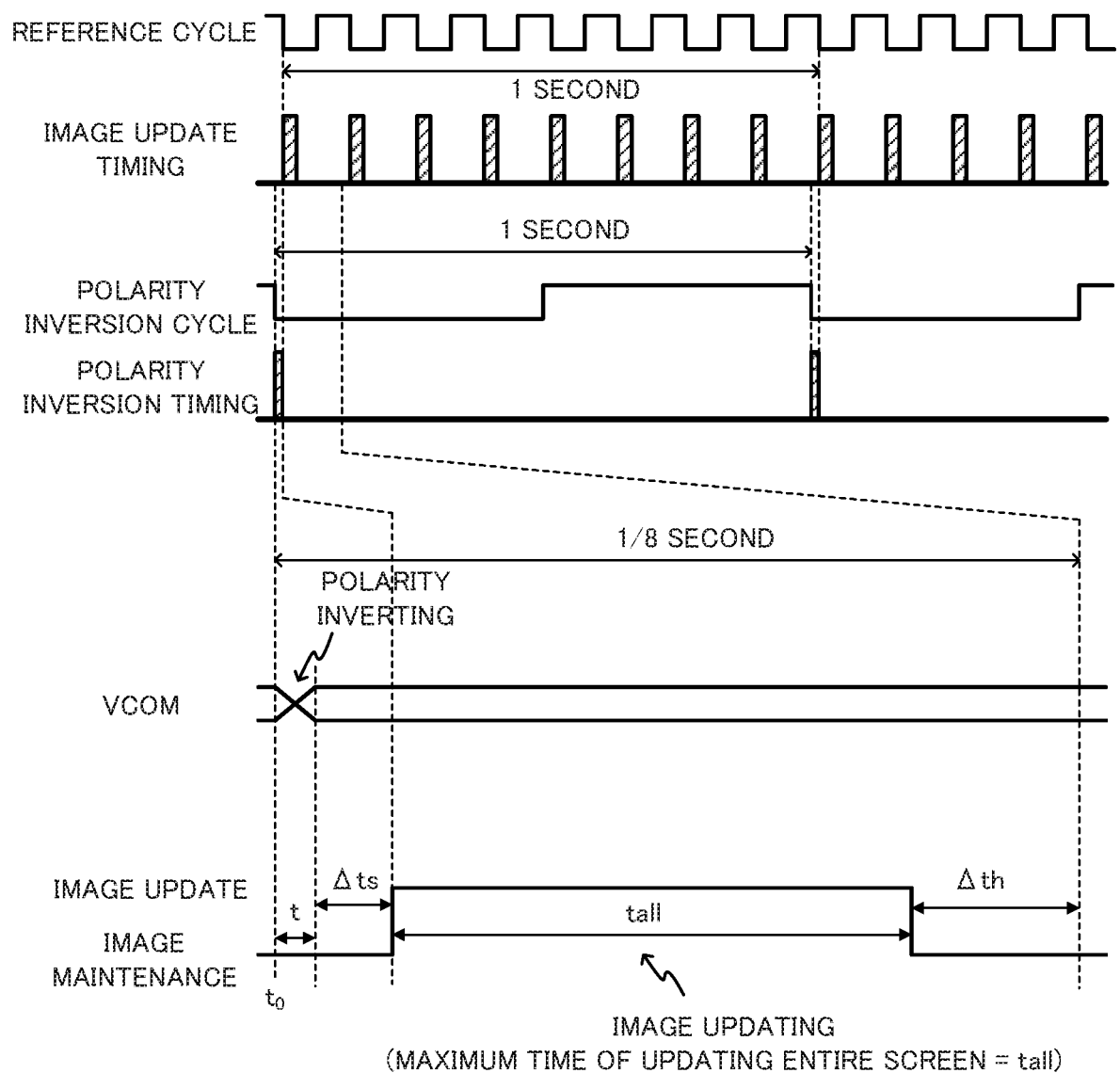
FIG. 12 is a drawing explaining the relationship between image update timing and polarity inversion timing in Embodiment 5.

In the embodiments described above, the reference cycle and the polarity inversion cycle are synchronized, and the polarity inversion timing is consistently the reference cycle timing. As such, in the image data output control processing, the CPU 120 outputs the image data after waiting t+Δts after the reference cycle timing. However, as illustrated in FIG. 12, in a case where the reference cycle is offset, in advance, t+Δts from the polarity inversion cycle, the CPU 120 can output the image data after the reference cycle timing, without waiting t+Δts. Next, Embodiment 5, which is an example of such a case, will be described.

The only differences between the electronic timepiece 100 according to Embodiment 1 and an electronic timepiece 104 according to Embodiment 5 are that the reference cycle is offset t+Δts from the polarity inversion cycle and that there is no wait of t+Δts in the image data output control processing. The other configurations and the voltage inversion control processing of the electronic timepiece 104 are the same as those of the electronic timepiece 100.

With the electronic timepiece 104, the ⅛ second interrupt cycle and the 1 second interrupt cycle of the timer circuit 114 are set so as to be offset t+Δts from each other. If it is difficult to set the interrupt cycles that are offset t+Δts by a single timer circuit 114, a timer circuit (not illustrated in the drawings) other than the timer circuit 114 may be prepared and interrupt cycles may be counted by offsetting the timer circuit 114 and the other timer circuit t+Δts from each other. In either case, the electronic timepiece 104 is configured to count the ⅛ second interrupt cycle in a state offset t+Δts after the 1 second interrupt cycle.

The interrupt generating circuit 115 outputs interrupt request signals at the various interrupt cycles, which are offset t+Δts from each other. As a result, the image update timing matches the reference cycle timing, as illustrated in FIG. 12.

Figure 13:
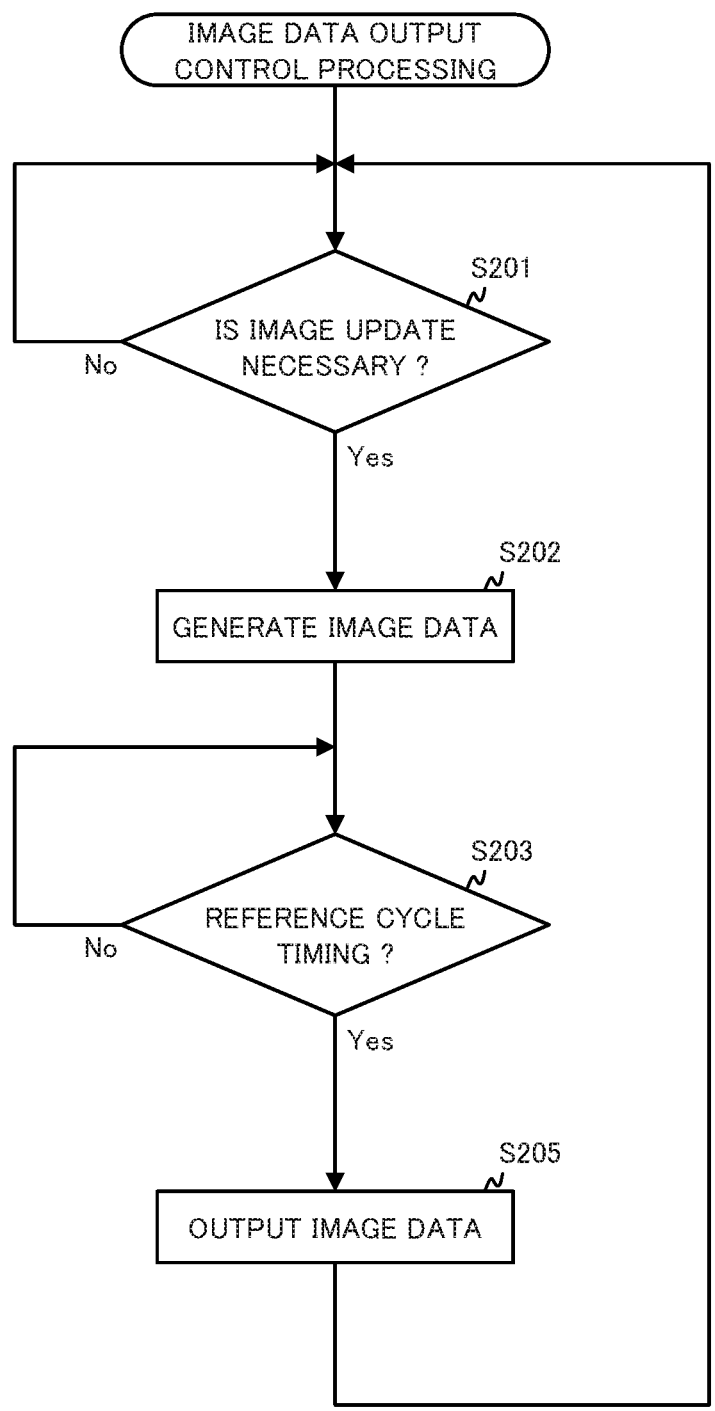
FIG. 13 is a flowchart illustrating the control procedures of image data output control processing, executed by a CPU of the electronic timepiece, according to Embodiment 5.

Next, the image data output control processing of the electronic timepiece 104 is described while referencing FIG. 13. Note that the image data output control processing of the electronic timepiece 104 is the same as the image data output control processing of the electronic timepiece 100 (FIG. 5), with the exception that step S204 has been eliminated. With the electronic timepiece 104, as described above, the interrupt cycles are set in advance such that the reference cycle timing is a time when t+Δts elapses after the polarity inversion timing, thereby eliminating the need for the step to wait t+Δts.

Thus, with the electronic timepiece 104, the need to wait t+Δts in the image data output control processing is eliminated and, as such, the load when the CPU 120 performs the image data output control processing can be reduced.

Embodiment 6

In the embodiments described above, the CPU 120 performs the voltage inversion control processing and the image data output control processing, but the present application is not limited thereto. In Embodiment 6, a case is described in which processing corresponding to the voltage inversion control processing and the image data output control processing is realized by dedicated hardware.

Figure 14:
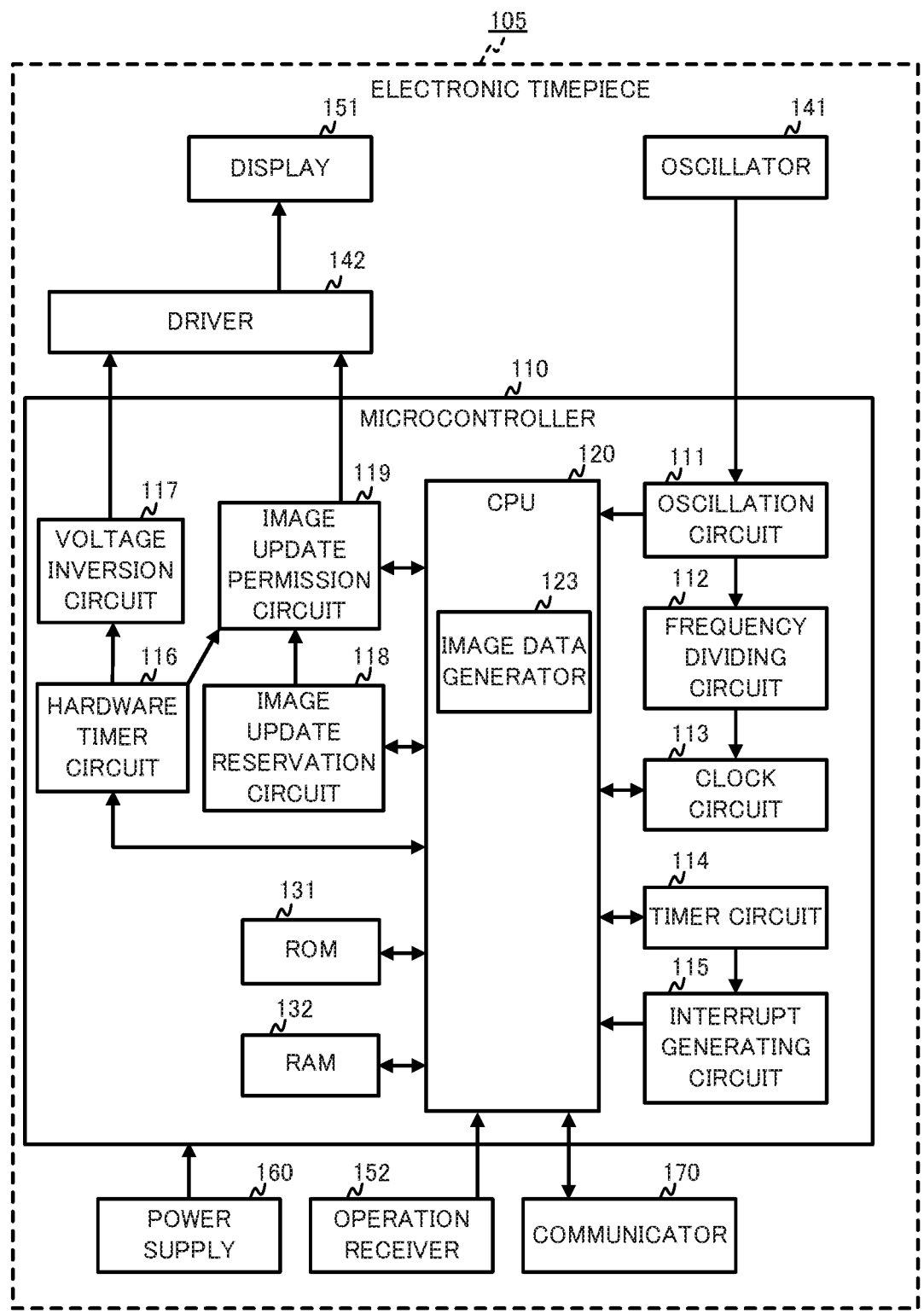
FIG. 14 is a drawing illustrating a configuration example of an electronic timepiece according to Embodiment 6.

As illustrated in FIG. 14, the configuration of an electronic timepiece 105 according to Embodiment 6 includes the configuration of the electronic timepiece 100 according to Embodiment 1 (FIG. 1) and, in addition thereto, includes, in the microcontroller 110, a hardware timer circuit 116, a voltage inversion circuit 117, an image update reservation circuit 118, and an image update permission circuit 119. Note that a configuration is possible in which the electronic timepiece 105 includes all or a portion of the hardware timer circuit 116, the voltage inversion circuit 117, the image update reservation circuit 118, and the image update permission circuit 119 outside the microcontroller 110. Additionally, while the CPU 120 of the electronic timepiece 105 need not function as the image data output processor 121 and as the voltage inversion processor 122, the CPU 120 of the electronic timepiece 105 does function as an image data generator 123. The other points of the configuration of the electronic timepiece 105 are the same as the configuration of the electronic timepiece 100 of Embodiment 1. As such, the components depicted in FIG. 14 that are the same as those described in Embodiment 1 are marked with the same reference numerals as in Embodiment 1, and descriptions thereof are foregone.

The hardware timer circuit 116 notifies the voltage inversion circuit 117 of the timing of the polarity inversion cycle (every 1 second), and notifies the image update permission circuit 119 of the timing of the reference cycle (every ⅛ second). Note that a configuration is possible in which the hardware timer circuit 116 is not separately provided and the CPU 120 notifies the voltage inversion circuit 117 and the image update permission circuit 119 of the timings of the polarity inversion cycle and the reference cycle via the oscillation circuit 111 or the timer circuit 114.

The voltage inversion circuit 117 instructs the driver 142 to invert the polarity of the common electrode voltage included in the display 151 every polarity inversion cycle. The voltage inversion circuit 117 realizes, by hardware, the functions of the CPU 120 as the voltage inversion processor 122 of Embodiment 1, and carries out processing equivalent to the voltage inversion control processing (FIG. 4) of Embodiment 1.

The image update reservation circuit 118 receives a signal from the CPU 120 when the generation of the image data by the CPU 120 is completed and the image data is stored in the RAM 132. Upon receipt of the signal the image update reservation circuit 118 stores that the image update has been reserved. Additionally, the image update reservation circuit 118 has a function to notify the CPU 120 of the completion of the image update when the image data is output by the image update permission circuit 119 and the image update is completed.

When it is stored in the image update reservation circuit 118 that the image update has been reserved, the image update permission circuit 119 instructs the driver 142 to output the image data stored in the RAM 132 to the display 151 at the next image update timing. Here, the image update timing is obtained by waiting t+Δts from when the image update permission circuit 119 receives the notification of the reference cycle timing issued from the hardware timer circuit 116. The image update permission circuit 119 realizes the functions of the CPU 120 as the image data output processor 121 of Embodiment 1 via hardware, and carries out processing equivalent to steps S203 to S205 of the image data output control processing (FIG. 5) of Embodiment 1.

Figure 15:
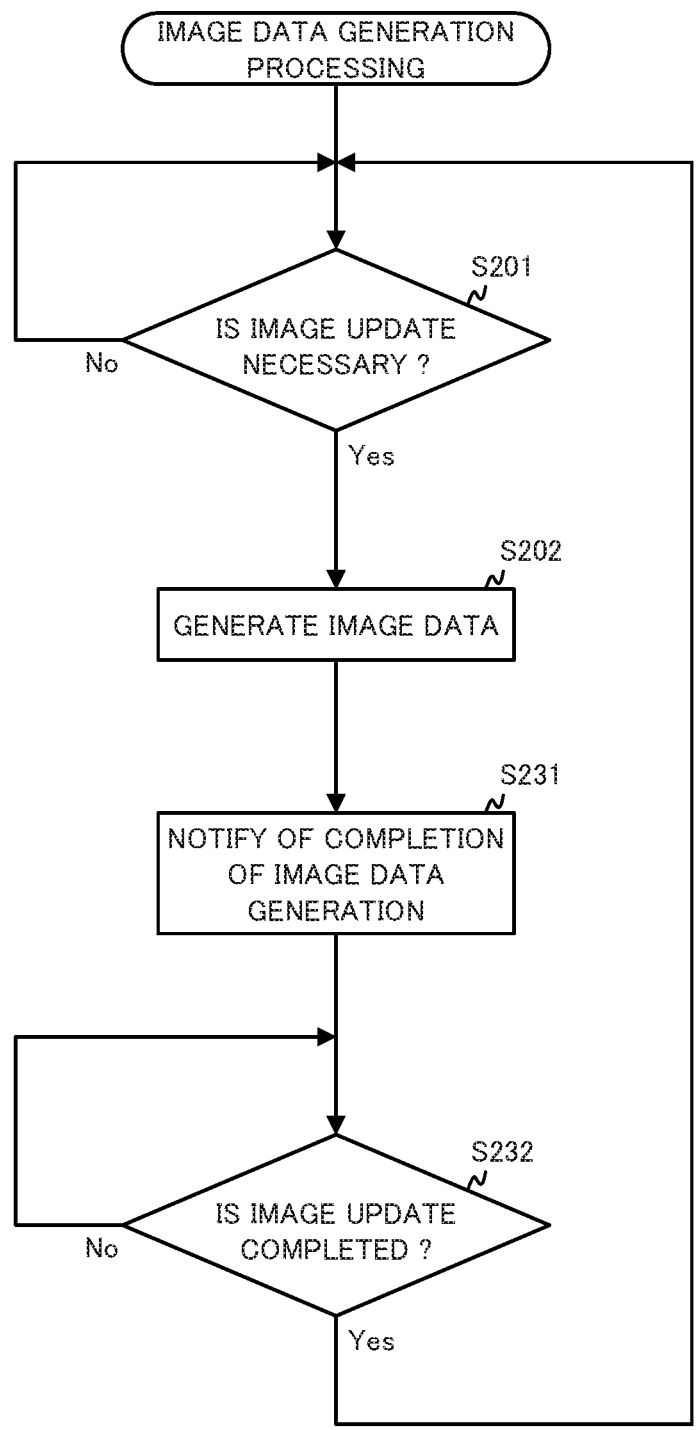
FIG. 15 is a flowchart illustrating the control procedures of image data generation processing, executed by a CPU of the electronic timepiece, according to Embodiment 6.

Next, the control procedures of image data generation processing executed by the CPU 120 of the electronic timepiece 105 will be described while referencing FIG. 15. In this processing, step S203, step S204, and step S205 are removed from the image data output control processing (FIG. 5) of Embodiment 1 and, in place thereof, step S231 and step S232 are added. As such, the added steps will be described.

In step S231, the CPU 120 notifies the image update reservation circuit 118 that the generation of the image data has completed. Thereafter, in step S232, the CPU 120 determines whether the image update has completed. It is possible to determine whether the image update has completed depending on whether a notification of the completion of the image update has been issued from the image update reservation circuit 118 to the CPU 120. If the image update is not completed (step S232; No), the CPU 120 returns to step S232 and waits until the completion of the image update. When the image update is completed (step S232; Yes), the CPU 120 returns to step S201.

Thus, with the electronic timepiece 105 according to Embodiment 6, there is no need for the CPU 120 to perform the voltage inversion control processing (FIG. 4) and the processing of steps S203 to S205 of the image data output control processing (FIG. 5) of Embodiment 1. As a result, the load of the CPU 120 can be reduced. Moreover, since the timing for updating the image data is constantly maintained by the reference cycle, the image data to be displayed can be smoothly updated.

Modified Example 1 of Embodiment 6

A configuration is possible in which the image update permission circuit 119 sets the image update timing t+Δts−tp after the reference cycle timing instead of t+Δts after the reference cycle timing. As a result of this configuration, a portion of the processing of the CPU 120 of the electronic timepiece 101 according to Embodiment 2 can be carried out by hardware.

Modified Example 2 of Embodiment 6

A configuration is possible in which the hardware timer circuit 116 notifies the image update permission circuit 119 of a timing every ¹⁄₁₆ second instead of every ⅛ as the reference cycle. As a result of this configuration, a portion of the processing of the CPU 120 of the electronic timepiece 102 according to Embodiment 3 can be carried out by hardware.

Modified Example 3 of Embodiment 6

As in Embodiment 4, a configuration is possible in which the operations of the image update permission circuit 119 are masked when it is determined that the time required to generate the image data for updating the second display is consistently longer than t+Δts, as illustrated in FIG. 10, thereby setting the second display to be perpetually rewritable. In such a configuration, the output of the image data is started immediately after the CPU 120 generates the image data for updating the second display and notifies the image update reservation circuit 118. As a result of this configuration, a portion of the processing of the CPU 120 of the electronic timepiece 103 according to Embodiment 4 can be carried out by hardware.

Modified Example 4 of Embodiment 6

A configuration is possible in which the hardware timer circuit 116 shifts the reference cycle of which the hardware timer circuit 116 notifies the image update permission circuit 119 by t+Δts after the polarity inversion cycle of which the hardware timer circuit 116 notifies the voltage inversion circuit 117. As a result of this configuration, a portion of the processing of the CPU 120 of the electronic timepiece 104 according to Embodiment 5 can be carried out by hardware.

In the various modified examples of Embodiment 6 described above, the load of the CPU 120 can be reduced by carrying out a portion of the processing of the CPU 120 by hardware.

Note that, the present disclosure is not limited to the embodiments described above and various modifications are possible.

For example, in the various embodiments described above, an example is described in which the display 151 is a memory in pixel (MIP) liquid crystal display. However, the type of the display 151 is not limited thereto. For example, the display 151 may be a typical TFT liquid crystal display. Note that, in order to take advantage of the characteristics (low power consumption when maintaining the display) of MIP liquid crystal, the image rewrite frequency of products that utilize MIP liquid crystal is often set lower than that of typical TFT liquid crystal displays. As such, in a MIP liquid crystal display, when the timing for inverting the polarity of the common electrode voltage overlaps with the timing for outputting the image data and a rewrite error occurs, the display state containing that error may continue longer than in a typical TFT liquid crystal display. However, by applying the driving device according to the present disclosure to the MIP liquid crystal display, it is possible to smoothly update the image data to be displayed and also reduce the likelihood of the occurrence of rewrite errors and, therefore, improve the reliability of the MIP liquid crystal display.

In Embodiment 3, a case is described in which the maximum time (tall) required to update the entire screen of the display 151 is 50 ms. However, the area to be updated of the display 151 in the update maximum time (tall) is not limited to the entire screen. A configuration is possible in which an update of a specific screen is envisioned that requires less time than the update of the entire screen. Examples of this specific screen update include the update of only one row, the update of the only the second digits, and the like. In such cases, a second reference cycle shorter than ⅛ second, namely ¹⁄₁₆ second, ¹⁄₃₂ second, or the like, may be selected as the reference cycle for updating this specific screen. With such a configuration, the timings at which the screen can be updated are two times, four times, etc., as many as the timings for the electronic timepiece 100 and, as such, the screen can be updated a corresponding amount faster and more frequently. However, in this case, the image data output control processing threads for the specific screen updates have different reference cycles, and the number of threads that are started up corresponds to the number of types of reference cycles. As such, care must be exercised as exclusive control must be carried out among these image data output control processing threads that have the various reference cycles.

In Embodiments 1 to 5 described above, examples are described in which the CPU 120 is compatible with multi-threading functionality and the voltage inversion control processing and the image data output control processing are executed in parallel. However, the present application is not limited thereto. In cases in which the CPU 120 is not compatible with multi-threading functionality, equivalent control can be performed by carrying out processing in which, first, the polarity of the common electrode voltage is initialized, then, before the various determinations are performed in the image data output control processing, the determination of whether it is the polarity inversion timing is performed and, if it is determined that it is the polarity inversion timing, the processing for inverting the polarity of the common electrode voltage is performed. For example, in a case in which Embodiment 1 is executed by a single thread CPU, it is preferable that the determination of step S102 of the voltage inversion control processing (FIG. 4) is performed immediately before steps S201 and S203 of the image data output control processing (FIG. 5). Moreover, it is preferable that, if the determination of step S102 is "Yes", step S103 of the voltage inversion control processing (FIG. 4) is executed, then step S201 or step S204 is executed, and if the determination is "No", step S201 or step S203 is directly executed. The same is applicable to the other embodiments as well.

Additionally, in the foregoing description, examples were described in which the ROM 131, made from nonvolatile memory such as flash memory, was used as the computer-readable medium on which the programs related to the voltage inversion control processing and the image data output control processing of the present disclosure were stored. However, the computer-readable medium is not limited thereto, and portable recording media such as hard disk drives (HDD), compact disc read-only memory (CD-ROM), and digital versatile discs (DVD) may be used. Additionally, a carrier wave may be used in the present disclosure as the medium to provide, over a communication line, the data of the program of the present disclosure In addition, the specific details such as the configurations, the control procedures, and the display examples described in the embodiments may be appropriately modified without departing from the scope of the present disclosure.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A driving device, comprising:
   a driver that drives a display; and
   a processor that controls the driver; wherein
   the processor inverts, in a time less than or equal to a reference inversion time and at an inversion timing of a constant polarity inversion cycle, a polarity of a voltage to be applied to the display; and
   the processor outputs image data to the driver at an image update timing of a cycle that is synchronized with the inversion cycle and that is equivalent to a reference cycle equal to the inversion cycle multiplied by an inverse of an integer, the image update timing being a time when a reference adjustment time elapses after a timing of the reference cycle, the reference adjustment time being less than a time of the reference cycle and greater than or equal to the reference inversion time,
   wherein the reference cycle is a cycle greater than or equal to a time that is a sum of (i) a maximum display update time that is a maximum value of a time required to output the image data to the driver at the image update timing, (ii) the reference inversion time, (iii) an inversion prohibited time required before polarity inversion, and (iv) a display update prohibited time required after the polarity inversion and before the maximum display update time.

2. The driving device according to claim 1, wherein the reference adjustment time is greater than or equal to a time that is a sum of the reference inversion time and the display update prohibited time.

3. The driving device according to claim 2, wherein the inversion cycle is 1 second, and the reference cycle is ⅛ second.

4. The driving device according to claim 3, wherein
the display comprises a plurality of pixels and a plurality of memory devices corresponding to the plurality of pixels, and
each memory device stores image data to be displayed by the corresponding pixel.

5. The driving device according to claim 2, wherein,
the display comprises a plurality of pixels and a plurality of memory devices corresponding to the plurality of pixels, and
each memory device stores image data to be displayed by the corresponding pixel.

6. The driving device according to claim 1, wherein the reference adjustment time is greater than or equal to a time that is a sum of the reference inversion time and the display update prohibited time minus an addressing time, the addressing time being a time required for the processor to designate an output address of the display to the driver.

7. The driving device according to claim 6, wherein the inversion cycle is 1 second, and the reference cycle is ⅛ second.

8. The driving device according to claim 6, wherein
the display comprises a plurality of pixels and a plurality of memory devices corresponding to the plurality of pixels, and
each memory device stores image data to be displayed by the corresponding pixel.

9. The driving device according to claim 1, wherein the inversion cycle is 1 second, and the reference cycle is ⅛ second.

10. The driving device according to claim 9, wherein
the display comprises a plurality of pixels and a plurality of memory devices corresponding to the plurality of pixels, and
each memory device stores image data to be displayed by the corresponding pixel.

11. The driving device according to claim 1, wherein
the inversion cycle is 1 second, and the reference cycle is ⅛ second, and
the processor generates image data at the image update timing of the reference cycle that is synchronized with the inversion cycle and is equal to the inversion cycle multiplied by the inverse of the integer, and output the generated image data to the driver.

12. The driving device according to claim 1, wherein
the inversion cycle is 1 second, and the reference cycle is ⅛ second, and
the processor generates image data at an image update timing of the reference cycle that is synchronized with the inversion cycle and is equal to the inversion cycle multiplied by the inverse of the integer, and outputs the generated image data to the driver.

13. The driving device according to claim 1, wherein
the display comprises a plurality of pixels and a plurality of memory devices corresponding to the plurality of pixels, and
each memory device stores image data to be displayed by the corresponding pixel.

14. The driving device according to claim 1, wherein the display comprises a plurality of pixels and a plurality of memory devices corresponding to the plurality of pixels, and each memory device stores image data to be displayed by the corresponding pixel.

15. An electronic timepiece, comprising:
the driving device according to claim 1;
a clock circuit that keeps a current time; and
a display that is driven by the driving device and that displays an image indicating the current time kept by the clock circuit.

16. A driving method executed by a driving device comprising a driver that drives a display, the method comprising:
inverting, in a time less than or equal to a reference inversion time and at an inversion timing of a constant polarity inversion cycle, a polarity of a voltage to be applied to the display; and
outputting image data to the driver at an image update timing of a cycle that is synchronized with the inversion cycle and that is equivalent to a reference cycle equal to the inversion cycle multiplied by an inverse of an integer, the image update timing being a time when a reference adjustment time elapses after a timing of the reference cycle, the reference adjustment time being less than a time of the reference cycle and greater than or equal to the reference inversion time,
wherein the reference cycle is a cycle greater than or equal to a time that is a sum of (i) a maximum display update time that is a maximum value of a time required to output the image data to the driver at the image update timing, (ii) the reference inversion time, (iii) an inversion prohibited time required before polarity inversion, and (iv) a display update prohibited time required after the polarity inversion and before the maximum display update time.

17. A non-transitory computer-readable storage medium storing a program that is readable by a computer of a driving device comprising a driver that drives a display, the program causing the computer to function as
a voltage inversion processor that inverts, in a time less than or equal to a reference inversion time and at an inversion timing of a constant polarity inversion cycle, a polarity of a voltage to be applied to the display; and
an image data output processor that outputs image data to the driver at an image update timing of a cycle that is synchronized with the inversion cycle and that is equivalent to a reference cycle equal to the inversion cycle multiplied by an inverse of an integer, the image update timing being a time when a reference adjustment time elapses after a timing of the reference cycle, the reference adjustment time being less than a time of the reference cycle and greater than or equal to the reference inversion time,
wherein the reference cycle is a cycle greater than or equal to a time that is a sum of (i) a maximum display update time that is a maximum value of a time required to output the image data to the driver at the image update timing, (ii) the reference inversion time, (iii) an inversion prohibited time required before polarity inversion, and (iv) a display update prohibited time required after the polarity inversion and before the maximum display update time.

* * * * *